United States Patent [19]

Chen et al.

[11] Patent Number: 4,470,254
[45] Date of Patent: Sep. 11, 1984

[54] PROCESS AND APPARATUS FOR COAL COMBUSTION

[75] Inventors: Nai Y. Chen; Darrell D. Whitehurst, both of Titusville, N.J.; Tsoung Y. Yan, Philadelphia, Pa.

[73] Assignee: Mobil Oil Corporation, New York, N.Y.

[21] Appl. No.: 378,160

[22] Filed: May 14, 1982

[51] Int. Cl.³ .......................... F02G 3/00; F02B 43/00
[52] U.S. Cl. ................................ 60/39.02; 60/39.12; 60/39.182; 60/39.464
[58] Field of Search ............... 60/39.02, 39.12, 39.181, 60/2, 39.464; 122/4 D; 431/7, 170; 110/244, 245, 263

[56] References Cited
U.S. PATENT DOCUMENTS

| | | | |
|---|---|---|---|
| 3,076,769 | 2/1963 | Pfeiffer | 252/417 |
| 3,234,735 | 2/1966 | Pirsh et al. | 60/39.181 |
| 4,223,529 | 9/1980 | Willyoung | 60/39.181 |
| 4,240,377 | 12/1980 | Johnson | 122/4 D |
| 4,321,233 | 3/1982 | Tsuji et al. | 431/170 |

OTHER PUBLICATIONS

Judd, M. et al. "Multistaged Fluidized Coal Combustor," Proceedings of the 14th Intersociety Conversion Engineering Conference, Boston, MA USA (Aug. 5–10, 1979).

Primary Examiner—Louis J. Casaregola
Assistant Examiner—Timothy S. Thorpe
Attorney, Agent, or Firm—A. J. McKillop; M. G. Gilman; J. F. Powers, Jr.

[57] ABSTRACT

The present invention provides two-stage and three-stage fluidized bed process embodiments for burning carbonaceous solids for the generation of heat to produce motive fluids for application in combined cycle power plant systems.

The finely-divided refractory solids employed in the fluidized beds may contain sorbent material to neutralize noxious gas constituents and yield a clean flue gas for venting.

10 Claims, 6 Drawing Figures

PROCESS AND APPARATUS FOR COAL COMBUSTION

BACKGROUND OF THE INVENTION

The present invention relates to a process for burning carbonaceous solids in multiple beds fluidized with molecular oxygen-containing gas. The invention also relates to an improved method for controlling and reducing particulate and $SO_x$ and $NO_x$ emissions from fluidized bed combustors while maximizing the carbon utilization of the combustor. This invention also relates to a combined cycle power plant using the combustion process of the present invention.

DESCRIPTION OF THE PRIOR ART

In the burning of coal in boilers, furnaces, oxidizing fluid beds and other systems, particles of incompletely burned coal are entrained in the outgoing flue gases. These particles are composed of inert materials mixed with the unburned carbon residue of the coal and are generically referred to as fly ash. The combustible content of the fly ash increases the quantity of particulate material discharged from the process, thus compounding the dust collection problem and increasing the amount of air pollution resulting from the combustion process. The emission of unburned combustible material also represents an economic loss.

Generally speaking, the carbon content in fly ash increases with the rate of combustion and increases as the size of the coal particle fed to the combustion process increases. The carbon content also tends to increase as the amount of excess air supplied to the combustion zone decreases.

Collection of carbon-containing fly ash and reinjection into the combustion zone of the furnace or boiler is an established art. In practice, fly ash is separated from the flue gas stream and is reinjected into the combustion zone, preferably the hottest part of the zone, where it is again subjected to combustion conditions.

However, this procedure has inherent disadvantages. All fly ash which is collected is of such a particle size that it readily elutriates from the combustion zone. Since the carbonaceous material contained in such recycled fly ash has a much lower volatility than does the fresh fuel introduced into the combustion zone, the fly ash carbon is much less combustible than is the fresh fuel. As a consequence, repeated recycling of such fly ash is necessary to achieve a reasonable reduction of the unburned combustible material in the fly ash. This results in increased dust loading of the collection equipment because of the continuous separation and recycling of particulate matter. Furnaces must be designed overly-large in order to ensure sufficient particle residence time for acceptable fuel burnup. Significant excess air over that theoretically required for complete combustion is also usually provided. Use of excess combustion air increases nitrogen oxide pollution as well as significantly decreasing the thermal efficiency of the furnace.

As one alternative, if a more efficient secondary system were available for completing combustion of fly ash carbon, it would be possible to construct smaller furnaces or boilers to tolerate a higher percentage of unburned material in flue gases leaving the primary combustion zone. Such a secondary system would also permit operation of the primary combustion zone using less excess air and would result in less stack gas heat loss, would require lower fan power and would result in greater overall efficiency.

The use of fluidized beds is recognized to be an attractive means of generating heat from solid carbonaceous fuels such as coal. In more conventional arrangements of this type, air is passed through a bed of particulate fuel to fluidize the bed and to promote combustion. When heat produced in the bed is used to convert water to steam, the fluidized bed system seems to offer an attractive combination of high heat release, improved heat transfer to surfaces within the bed, and consequently a smaller boiler size. However, unacceptable rates of corrosion have been found when hot metal surfaces are placed in fluidized beds of burning coal, probably due to cyclic exposure to oxidizing and reducing gases. Furthermore, provision must be made for handling and disposing of ash.

Insertion of heat exchange means in fluidized beds of burning carbonaceous materials also involves the following disadvantage: the bed must be comparatively low in order to keep pressure drop within reasonable limits, the presence of cooling surfaces in the lower part of the reactor space disturbs the transverse mixing of solids in the fluidized beds so that inhomogeneities of temperature occur, and the operation of the reactor cannot be easily adapted to the output actually required, which often fluctuates. This adaptation can be accomplished virtually only by a decrease in temperature, although such decrease involves less satisfactory combustion in fluidization conditions, or by a shutdown of individual reactor units.

U.S. Pat. No. 2,866,696 to Godel describes an improvement in this regard. Godel discovered that by fluidizing particles at temperatures between 900°–1200° C., small ash agglomerates form throughout the bed and remain fluidized and interspersed between carbonaceous particles. As a coal particle burns, ash is released. Ash sticks to ash and not to coal, and agglomerates of ash are formed and grow in size. Eventually they sink to a moving inclined grate which underlies the bed and which carries them to an ash pit. The bed operates adiabatically, except for radiation to the upper surface. The bed is limited to the desired ash-sintering temperature by maintaining a high inventory of carbon in the bed. Sulfur appears in the off gases from the bed as $H_2S$. Secondary combustion air is admitted to the space above the bed where $CO$ and $H_2S$ burn to $CO_2$ and $SO_2$, respectively. As a result of the high velocity of fluidizing gas and the low air-to-fuel ratio, the coal treating capacity of the Godel apparatus is surprisingly large.

Godel discloses a further improvement of his process in U.S. Pat. No. 3,302,598 which teaches contacting hot clinkers withdrawn from the combustion zone of the U.S. Pat. No. 2,866,696 process with air in an auxiliary furnace formed by the ash pit column of the main furnace. The process taught by these two patents will hereinafter be referred to as the Ignifluid system.

In the Ignifluid, there is a large circulation of carbon particles upward through the boiler into mechanical dust collecting devices and thence into a lance for reinjection at high velocity into the deep end of the fluidized bed. This rate of circulation has been found to be as high as one-half of the coal feed and carbon utilization efficiency has been found to be highly dependent on the recovery and careful reinjection of the fine carbon particles to the fluidized bed.

U.S. Pat. No. 3,431,892, also by Godel, teaches a combustion process comprising a primary furnace such as those disclosed in the U.S. Pat. No. 2,866,696 or U.S. Pat. No. 3,302,598 patents, supra, and a secondary furnace which contains at least one fluidized layer of granulated refractory substance having heat exchange surfaces located therein. Combustion gases containing entrained ash-like carbon particles from the primary furnace are mixed with secondary air and introduced to the secondary furnace. Post combustion temperatures sufficient to burn the entrained carbon particles but lower than that at which the ash softens and agglomerates are maintained by heat exchange in the beds of the secondary furnace. The incombustible granulated substances which comprise the fluidized bed(s) of the secondary furnace may be a substance which is capable of absorbing or neutralizing noxious oxides present in the combustion gases. As a specific embodiment of the U.S. Pat. No. 3,431,892 process, the primary furnace is operated at a temperature of 1075° C., the secondary furnace comprises two beds of fluidized incombustible granulated substances wherein the first bed is maintained at a temperature of 900° C. and the second bed is maintained at a temperature of 700° C., and the flue gas from the secondary furnace passes through a heat recovery zone comprising two additional fluidized beds of an incombustible granular substance having heat exchange surfaces located therein. Use of the secondary furnace with fluidized layers maintained at lower temperatures reduces the heat exchange surface required as compared to previously known boilers.

Other combustion methods are known which employ combinations of dense fluidized beds and entrained fluidized beds of solids to effect gasification/combustion of coal and other carbonaceous fuels. For example, see U.S. Pat. Nos. 3,843,053; 4,103,646, 4,154,581; and 4,183,330. However, none of these processes provide for effective ash removal and recovery while at the same time attaining high levels of carbon utilization.

Further, it is well known to couple a Brayton-cycle gas turbine thermodynamically with a Rankine-cycle steam turbine to achieve a higher overall power plant efficiency than is obtainable for either cycle working alone (operating in the same range of working fluid temperatures and pressures). Thermal energy which would be rejected from a simple cycle Brayton gas turbine plant and lost is utilized in combined cycle configurations to heat feedwater or steam for the Rankine-cycle steam turbine and thus achieve more power generation for a given calorific input. The higher efficiency reduces fuel requirements, costs, and the quantity of undesirable effluents from the discharge of combustion products to the environment. Since most fuels for combustion power plants come from depletable fossil reserves, higher efficiencies are also desired for conservation.

One limitation on the use of integrated high-efficiency combined cycle plants, however, results from the purity requirements of the hot gases passing through the gas turbines to avoid hot corrosion, fouling and rapid deterioration of turbine parts. To avoid these problems, there has been a reliance on combustion of "clean fuels" such as natural gas or refined or specially treated petroleum fuels, which are becoming less competitive in availability and price.

Various suggestions have been made to obtain the benefits of using a fuel such as coal as the source of energy in a combined steam and gas turbine power plant since, in areas such as the United States, indigenous coal reserves are much larger than those of oil or natural gas. In one such power plant proposal, provision is made for burning coal in a pressurized fluidized bed and taking the hot combustion gas off as motive fluid to the gas turbine. Although quite efficient, this scheme necessitates a costly hot gas clean-up system and special cladding of the gas turbine hot gas path parts to prevent erosion. To the extent that these measures are deficient or of limited life overall power plant reliability and availability are reduced.

U.S. Pat. No. 4,116,005 discloses one means by which sulfur-bearing coal may be burned in a fluidized bed combustor in an environmentally acceptable manner and in a way that avoids gas turbine reliability problems due to hot gas corrosion and fouling. There is taught the use of a fluidized bed combustor wherein particulate coal is burned under near atmospheric pressure conditions and in the presence of sulfur-sorbing particles to control emissions of sulfur oxide compounds. A stream of clean pressurized air serves as motive fluid for the gas turbine, gaining heat energy from the fluidized bed via an in-combustor heat exchanger through which the air stream passes. Steam for the steam turbine is generated also by in-combustor heat exchangers with the combination thus providing a power plant of high efficiency and capable of utilizing the energy of coal combustion in an environmentally acceptable manner without costly gas clean-up. While the atmospheric fluidized bed combustor for combined cycle power plants is obviously highly advantageous in that corrosive combustion products do not pass through the gas turbine, certain limitations have nevertheless been recognized and improvements sought therefor. One limitation has been the operating temperature of the fluidized bed. To maintain the effectiveness of the sulfur-sorbing particles in removing sulfur oxide, it has been necessary to keep the temperature of the bed in which the particles reside at a temperature lower than the state of the art turbine inlet temperature capabilities of the modern gas turbine. This results in an overall plant efficiency somewhat less than would be obtained if higher temperature motive fluid were attainable. It has also been recognized that the greatest practical reduction in the concentration levels of oxides of sulfur and nitrogen in effluent streams is desirable, and that more compact equipment would be advantageous.

U.S. Pat. No. 4,223,529 discloses a combined cycle power plant using a pressurized fluidized bed combustor in which coal or other carbonaceous fuel is burned at elevated pressure to generate a pressurized combustion gas from which heat is extracted through heat exchanger means to a stream of pressurized air. The heated pressurized air, serving as a clean motive fluid, is expanded through an air turbine connected to drive a power load such as an electrical generator or a gas compressor. The pressurized combustion gas, cooled somewhat by passage through heat exchangers, is said to require minimal clean-up prior to its introduction to a second gas expansion turbine powered by combustion gases. The patent further teaches that since the combustion gas is substantially cooled and minimally cleaned before passage through the combustion gas turbine, problems due to hot gas corrosion, erosion and fouling within the turbine are minimized within the context of the process disclosed.

There remains a need for carbonaceous solids combustion systems of improved efficiency which yield reduced accumulation of solid and gaseous byproduct pollutants.

Accordingly, it is an object of this invention to provide an improved process for combusting coals or other ash-containing solid carbonaceous fuels with capability of utilizing substantially all carbon in the fuel and of discharging agglomerated ashes containing little carbon.

It is another object of this invention to provide such a process wherein the flue gases discharged are relatively free of particulates, $SO_x$, $NO_x$, and other contaminants.

It is a further object of this invention to provide a combustion process which allows considerable flexibility in the manner of recovering heat and energy released within the combustion zones.

Other objects and advantages of the present invention shall become apparent from a consideration of the description and drawings.

SUMMARY OF THE INVENTION

One or more objects of the present invention are accomplished by the provision of a two-stage fluidized bed process for burning carbonaceous solids which comprises (1) supplying particulate carbonaceous fuel and a molecular oxygen-containing gas stream as fluidizing medium to a primary combustion zone containing a slow fluidized bed of solids comprising carbonaceous particles and agglomerating ash particles, said primary combustion zone containing heat exchange means and being maintained at a temperature in the range between about 1200°–1400° C. sufficient to promote ash agglomeration but insufficient to cause ash fusion, and the superficial velocity of said fluidizing medium being sufficient to allow roughly spherical ash agglomerates to grow independently of one another without massive agglomeration; (2) withdrawing agglomerated ash matter from the bottom of the primary combustion zone, which ash matter constitutes at least about 95 weight percent of the carbonaceous fuel ash content; (3) withdrawing combustion gases containing entrained finely-divided carbon and having a temperature greater than 700° C. from the top of the primary combustion zone; (4) contacting the combustion gases containing entrained finely-divided carbon with a secondary molecular oxygen-containing gas stream and finely-divided refractory solids to provide a slow fluidized bed in a secondary combustion zone, said second combustion zone being situated in a separate reactor unit and containing heat exchange means and being maintained at a temperature in the range between about 600°–900° C.; (5) withdrawing flue gases containing entrained finely-divided refractory solids from the top of said secondary combustion zone; and (6) separating the flue gases from the entrained finely-divided refractory solids in a separation zone.

In a further embodiment, the present invention provides a three-stage fluidized bed process for burning carbonaceous solids which comprises (1) supplying particulate carbonaceous fuel and a molecular oxygen-containing gas stream as fluidizing medium to a first stage combustion zone containing a slow fluidized bed of solids comprising carbonaceous particles and agglomerating ash particles; said primary combustion zone containing heat exchange means and being maintained at a temperature in the range between about 1200°–1400° C. sufficient to promote ash agglomeration but insufficient to cause ash fusion, and the superficial velocity of said fluidizing medium being sufficient to allow roughly spherical ash agglomerates to grow independently of one another without massive agglomeration; (2) withdrawing agglomerated ash matter from the bottom of the first stage combustion zone, which ash matter constitutes at least about 95 weight percent of the carbonaceous fuel ash content; (3) withdrawing combustion gases containing entrained finely-divided carbon and having a temperature greater than 700° C. from the top of the first stage combustion zone; (4) contacting the combustion gases containing entrained finely-divided carbon with a molecular oxygen-containing gas stream and finely-divided refractory solids to provide a fast fluidized bed in a second stage combustion zone, said combustion zone being maintained at a temperature in the range between about 700°–1000° C.; (5) withdrawing flue gases containing entrained finely-divided refractory solids from the top of said fast fluidized bed second stage combustion zone; (6) separating the flue gases from the entrained finely-divided refractory solids in a separation zone; (7) contacting the finely-divided refractory solids recovered from the separation zone with a molecular oxygen-containing gas stream as fluidizing medium in a third stage combustion zone containing a slow fluidized bed of the finely-divided refractory solids, said fluidized bed containing heat exchange means therein to maintain the temperature of the fluidized refractory solids in the third stage combustion zone at a temperature within the range between about 600°–800° C.; (8) withdrawing and recovering clean flue gases from the top of said slow fluidized bed third stage combustion zone; and (9) withdrawing finely-divided refractory solids from the bottom of said slow fluidized bed third stage combustion zone, and recycling the said withdrawn refractory solids to the step (4) fast fluidized bed second stage combustion zone.

DETAILED DESCRIPTION OF THE INVENTION

Anthracities, subanthracites, bituminous coals, subbituminous coals, lignites, and other ash-containing carbonaceous materials are suitable fuels for the process embodiments of the present invention. For convenience, these fuels will hereinafter be referred to as "carbonaceous solids", or simply as "coal".

Considered broadly, the present invention concept combines known types of furnaces to produce an integrated method of coal combustion that maximizes the desirable features and minimizes the undesirable features of the various furnaces. Referring to the three-stag process embodiment, the first stage furnace employs a slow fluidized bed of ash-containing carbon-rich solids operated at a sufficiently high temperature to promote ash agglomeration and provides for removal and collection of the agglomerated ash. It operates substantially in the manner disclosed by Godel. The second stage furnace is designed for fast fluidized bed combustion, and the third stage furnace is designed for very slow fluidized bed combustion.

An important aspect of the invention process is the incorporation of heat exchange means in two of the combustion zones. A major proportion of the combustion heat is recovered by the heat exchange means in the primary combustion zone, i.e., in the first stage combustion zone.

The first stage combustion zone can be an Ignifluid furnace such as is described in U.S. Pat. Nos. 2,866,696 and 3,302,598, the disclosures of which are incorporated herein by reference. What is required of the first stage combustion zone of the invention process is the maintenance of a slow fluidized bed of coal fluidized by air, the bed temperature being sufficient to promote ash agglomeration but insufficient to cause ash fusion and the superficial velocity of the fluidizing air being sufficient to allow roughly spherical ash agglomerates to grow independently of one another without risk of massive agglomeration. Temperatures will generally be within the range between about 1200°–1400° C.

The particle size of the coal fed to the first stage combustion zone is related to the reactivity of the coal and to the superficial fluidizing air velocities. Generally, the more reactive the fuel that is to be combusted, the larger the top size of the feed fuel should be. Time is required for ash matter to "sweat out" from the interior of the carbon particle as it undergoes gasification/combustion. The sweated ash matter forms a bead upon the surface of the carbon particle, often several hundred micrometers in diameter, before it detaches from the carbon particle to become a free ash agglomerate. A certain number of such agglomerates must be formed from the larger coal particles furnished to the first stage Ignifluid type furnace in order to provide a sufficient number of seed agglomerates for capture and accumulation of mineral matter released in more finely divided form from the smaller carbon particles.

Because the reactive fuel burns faster, it must be provided in a larger top size to allow time for accumulation of seed agglomerates. See Yerushami, J. et al "Agglomeration of ash in fluidized beds of gasifying coal: the Godel phenomenon", Science, Volume 187, pages 646–648 (Feb. 21, 1975). Accordingly, an active fuel such as lignite must be supplied to the Ignifluid type furnace crushed to a top size of about 20 millimeters. An anthracite, on the other hand, should be crushed to a top size of 6 millimeters. Either fuel may contain fine particles. Generally, coal particles undergoing partial combustion/gasification in the first stage combustion zone will range up to about one quarter of an inch.

Ash agglomerates are preferably withdrawn from the primary combustion zone by an inclined upwardly-moving foraminous grate upon which the slow fluidized bed is maintained, in the manner taught by Godel. It is within the scope of the present invention to incorporate "post/combustion" of ash agglomerates in the manner suggested by Godel U.S. Pat. No. 3,302,598. Alternative methods for withdrawing ash agglomerates are via gravitating beds resting upon mechanical grates or via gravitating beds resting upon a "slagging grate" of the type disclosed in U.S. Pat. No. 3,253,906.

The superficial fluidizing velocity in the slow fluidized bed of the first stage combustion zone usually will be within the range between about 0.2–4 feet per second.

The combustion gas stream from the first stage combustion zone comprises fine carbon particles entrained in combustible gases. A major proportion of the generated heat is recovered from this combustion gas by heat exchange means such as by providing the wall of the slow fluidized bed reactor with cooling surfaces (preferably above the point of coal introduction) and/or by providing cooling surfaces in the free space of the reactor above the slow fluidized bed. If intermediate heat recovery is employed at this point in the process, it is important that the temperature of the combustion gas not be reduced below the ignition temperature of the carbon particles. The temperature of the first stage combustion effluent gas should be greater than 700° C., preferably greater than 760° C.

The high temperature combustion gas effluent from the first stage combustion zone entrains about 30–50 weight percent of the carbon originally introduced as coal feed, and carries it to the second stage combustion zone where it is contacted with a molecular oxygen-containing gas medium and recycling refractory solids maintained as a fast fluidized bed (i.e., in the three-stage combustion zone embodiment). Preferably, noxious gas sorbents such as limestone or dolomite are present to adsorb $SO_x$ and $NO_x$. Other refractory substrates such as sand may also be employed.

The finely divided refractory solids circulate between the second stage combustion zone and a third stage combustion zone comprising a slow fluidized bed fitted with an array of heat exchange tubes. The overhead effluent stream from the fast fluidized bed second stage combustion zone may be separated into solids and gaseous fractions, with the refractory solids being transferred into the slow fluidized third stage combustion zone. From the slow fluidized bed in the third stage combustion zone the refractory solids are recycled to the bottom of the fast fluidized bed in the second stage combustion zone. The flow rate may be controlled by an air stream or other suitable regulating means.

The noxious gas sorbents may be of a particle size as large as 0.5 inch, usually less than 0.25 inch, and more usually will be finely divided, to less than about 100 U.S. mesh. Crushed sorbent may also be used, a course fraction of which will settle and form a bubbling fluidized bed at the bottom of the fast fluidized second stage combustion zone, and the finer fractions of which will be entrained and circulated via the third stage combustion zone bed to form a fast fluidized bed in the upper portion of the second stage combustion zone. Disintegration of the sorbent particles will contribute additional fines.

The air fluidizing velocity in the fast fluidized bed second stage combustion zone will not usually exceed 45 feet per second, and generally will range between about 5–30 feet per second.

The height of the second stage combustion zone and the fluidized density within it are chosen to achieve a minimum pressure drop compatible with high efficiencies of post combustion and sulfur capture. The fluidized density may be lower than five pounds per cubic feet but usually no lower than three pounds per cubic feet.

The volume of the slow fluidizing bed in the third stage combustion zone is chosen to accommodate the quantity of air, given a specific fluidizing velocity, needed to attain the desired heat transfer between the recirculating solids and the fluidizing air. The fluidizing velocitiy usually will vary in the range between about 0.5–10 feet per second. The area as well as the height of the third stage combustion bed are also selected to provide sufficient bed volume to accommodate suitably spaced boiler tubes.

At a given gas velocity, the fluidized density of the fast fluidized bed in the second stage combustion zone will be dependent upon the circulation rate of the solids as well as the pressure driving force afforded by the heads of solids in the third stage slow bed and in the transfer line connecting the third stage slow bed to the second stage fast bed. For example, to establish a density of five pounds per cubic feet in a second stage fast bed fluidized at 20 feet per second will require a solids circulation rate in the neighborhood of 50 pounds per second per square foot of second stage fast bed area.

The pressure in the combustion zones is not critical, and the combustion zones may be operated at pressures ranging from greater to lesser than atmospheric pressure. However, the fast fluidized bed second stage combustion zone of the present invention process can be operated advantageously at pressures greater than atmospheric.

Solid/Gas Contacting Modes

In a slow fluidized bed, the fluidized solids remain in place, the bed displays a distinct upper surface, and the bed is characterized by a relatively continuous solids "phase" in a relatively discontinuous gas "phase". The solids mainly occupy the so-called "dense phase", and the gas phase passes through the bed primarily in the form of "bubbles". For fine solids, solids having a mean particle size between about 50 and 100 microns, the fluidization velocity appropriate for slow fluidization is generally below about 2 feet per second.

If the fluidization velocity to a slow fluidized bed is gradually increased, the density of the fluidized bed decreases but the rate of decrease in density with an increase in velocity is not marked. Ultimately, however, a critical velocity is abruptly reached at which the density of the bed drops sharply, i.e., the bed appears suddenly to "thin out". Unless the space containing the bed is extremely tall, the gas will convey most of the solids overhead and away from the space. This critical velocity may be termed the "dilute phase transition velocity for zero transport".

If the space is supplied at the bottom with gas at a velocity somewhat greater than this transition velocity, and if particulate solids are supplied to the bottom of the vessel at a definite rate, usually the solids will be conveyed upward through the vessel and out at the top in dilute phase transport. However, if the rate of supply of particulate solids is gradually increased, at a critical rate of supply the inventory of solids in the space will sharply increase. Dense phase regions appear, and the solids in these regions tend to stream downward at a high velocity. If the gas velocity is further increased, a critical velocity is again reached at which the inventory of solids drops, and the solids supplied to the space are again conveyed upward in dilute phase transport. This critical velocity may be termed the "dilute phase transition velocity for transport" at the rate of supply of solids to the space. For a given rate of supply of solids to the bottom of a space, the "fast fluidized state" is a convenient term to denote the condition in the space when the prevailing gas velocity is greater than the dilute phase transition velocity for zero transport and less than the dilute phase transition velocity for transport at the given rate of supply.

The slip velocities of solids in fast fluidized beds are relatively large as compared to the slip velocities encountered in entrained bed systems. In entrained bed systems, upward conveying of solids occurs under conditions of relatively low pressure gradient. In the fast fluidized bed system, there is greater back mixing. This results in good thermal conductivity and uniformity of temperature. By contrast, in dilute phase conveying or entrained bed systems, lesser back mixing occurs and there will be a temperature gradient if a thermal reaction occurs between the conveying gas and the solids.

In contrast to the slow fluidized bed, the fast bed exhibits no upper surface but substantially fills the space available. There is a marked gradient in solids density between the bottom and top of the space, the density being greater at the bottom. An average inventory of solids is typically 5–10 pounds of solids per cubic foot of reaction space. The solids phase in the fast fluidized bed appears on the whole to be the discontinuous phase, and the gas phase appears on the whole continuous. The solids phase appears generally to take the form of falling streamers and ribbons, while the gas appears to flow upward in between. The gas conveys solid upward, and much refluxing of the solids occurs in the fast fluidized bed.

Oxidizing Medium

The oxidizing media comprise molecular oxygen-containing streams which are in the gas phase under the temperature and pressure conditions of the process steps in which they are employed. An oxidizing medium may contain, in addition to molecular oxygen, other gaseous constituents such as steam, carbon dioxide, inert gas-phase materials, and the like. By the term "inert" as used in this context, is meant a material which is inert with respect to the carbonaceous materials at operating conditions of the process step wherein the oxidizing medium is employed. For example, nitrogen is an "inert" material, even though it may react to some limited extent with oxygen under the process conditions to form nitrogen oxides.

Unlike the first stage and second stage combustion zones of the process, only limited oxidation reactions will take place in the third stage combustion zone. Depending on the nature of the carbonaceous fuel and the operating conditions of the first stage and second stage combustion zones, relatively more or less finely-divided carbon particles will be present in the flue gases withdrawn from the top of the second stage combustion zone. The temperature of the third stage combustion zone is within the range from about 600°–800° C. Minimum ignition temperatures for the finely-divided carbon particles are about 700°–760° C. Accordingly, if substantial amounts of finely-divided carbon are introduced into the third stage combustion zone, it may be desirable to operate it at the higher end of the recited temperature range. It should be additionally noted that the finely-divided uncombusted carbon particles present in the third stage combustion zone may be returned to the second stage combustion zone for combustion therein if the particles have a sufficiently large particle size.

In a specific practice of the present invention wherein flue gases containing finely-divided refractory solids are withdrawn from the top of the second stage combustion zone and transferred to the third stage combustion zone without phase separation, the second stage combustion zone flue gases may comprise the oxidizing medium. Depending on the rate of molecular oxygen addition to the second stage combustion zone, the combustion reactions occurring therein, and the operating conditions, more or less molecular oxygen will be present in the second stage combustion zone flue gases. This oxygen content may be sufficient to support the oxidation reactions of the third stage combustion zone, or additional molecular oxygen-containing gas (e.g., air) may be added to the third stage combustion zone.

The slow fluidized bed in the third stage combustion zone fulfills a number of functions, the primary one being additional recovery of heat from the recycling refractory solids. Other functions include serving as a solid reservoir and a type of standpipe providing control and driving force for the circulation of the refractory solids at a rate sufficient to establish the state of fast fluidization in the second stage combustion zone. Temperatures are maintained within a range between about 600°–800° C. Refractory solids are recycled to the second stage fast fluidized bed for additional heat recovery, and excess refractory solids and spent sorbent are withdrawn. Clean flue gas from the third stage combustion zone is recovered for further energy conversion or heat recovery in economizers. It may be combined with the flue gas recovered from the fast fluidized bed second stage combustion zone.

Figure 1:
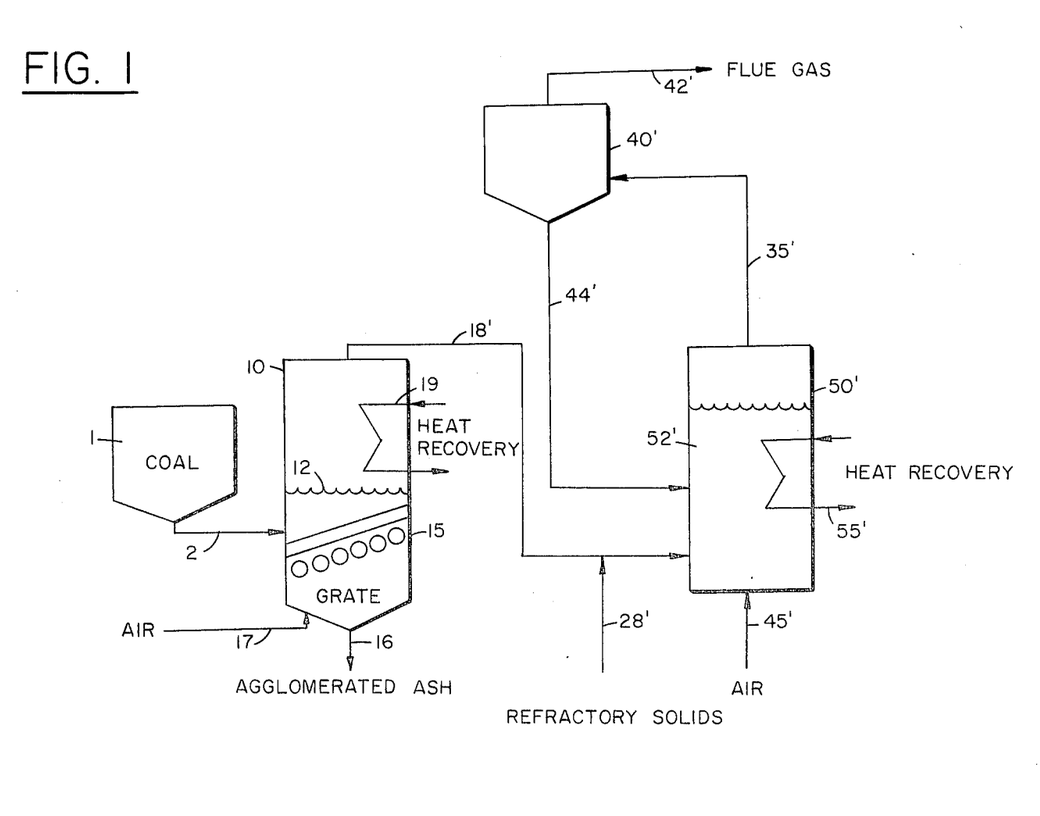
FIG. 1 is a simplified schematic of a two-stage fluidized bed embodiment of the carbonaceous solids combustion process of the present invention.

Referring now to FIG. 1, a two-stage fluidized bed embodiment of the present invention process will be described with respect to coal combustion.

Particulate coal 1 is supplied by line 2 to a primary combustion zone 10 containing a slow fluidized bed of solids 12 comprising carbonaceous particles and agglomerating ash particles. Agglomerates of ash form in bed 12, grow in size, and eventually sink to moving inclined grate 15 which underlies the bed 12 and which carries the ash agglomerates to an ash pit (not shown) via line 16. Air which serves as an oxidizing and fluidizing gas medium is admitted to combustion zone 10 via line 17. The superficial velocity (e.g., about 10 feet per second) of the air flow introduced via line 17 is sufficient to allow roughly spherical ash agglomerates to grow independently of one another without risk of massive agglomeration. The temperature maintained in combustion zone 10 is sufficient to promote ash agglomeration but insufficient to cause ash fusion (e.g., about 1300° C.), and may be controlled to optimize for each type of coal feed.

Combustion gases containing entrained finely-divided carbon are withdrawn from primary combustion zone 10 via line 18'. FIG. 1 includes a heat exchanger means 19 disposed in combustion zone 10 above the upper level of the bed of solids 12. This heat exchange means is schematically portrayed. It can comprise means such as heat exchange tubes placed within the walls of the equipment defining combustion zone 10. In such an embodiment, it is important that the temperature of the stream in line 18' not be lowered below 700° C., preferably not lower than 760° C., to maintain the temperature of the stream in line 18' above the ignition temperature of the entrained finely-divided carbon.

The combustion gas effluent containing entrained finely-divided carbon in line 18' is passed into secondary combustion zone 50', in admixture with finely-divided refractory solids (e.g., sand) which is supplied through line 28'. Air as an oxidizing and fluidizing medium is introduced into combustion zone 50' by way of line 45' at a velocity of about 15 feet per second. The temperature of the slow fluidized bed in combustion zone 50' is maintained at about 750° C. in balance with heat exchanger 55'.

Flue gas containing entrained finely-divided refractory solids are withdrawn from combustion zone 50' through line 35' and entered into separation means 40'. Clean flue gas is recovered via line 42', and the separated refractory solids are recycled by means of line 44' to combustion zone 50'.

Figure 2:
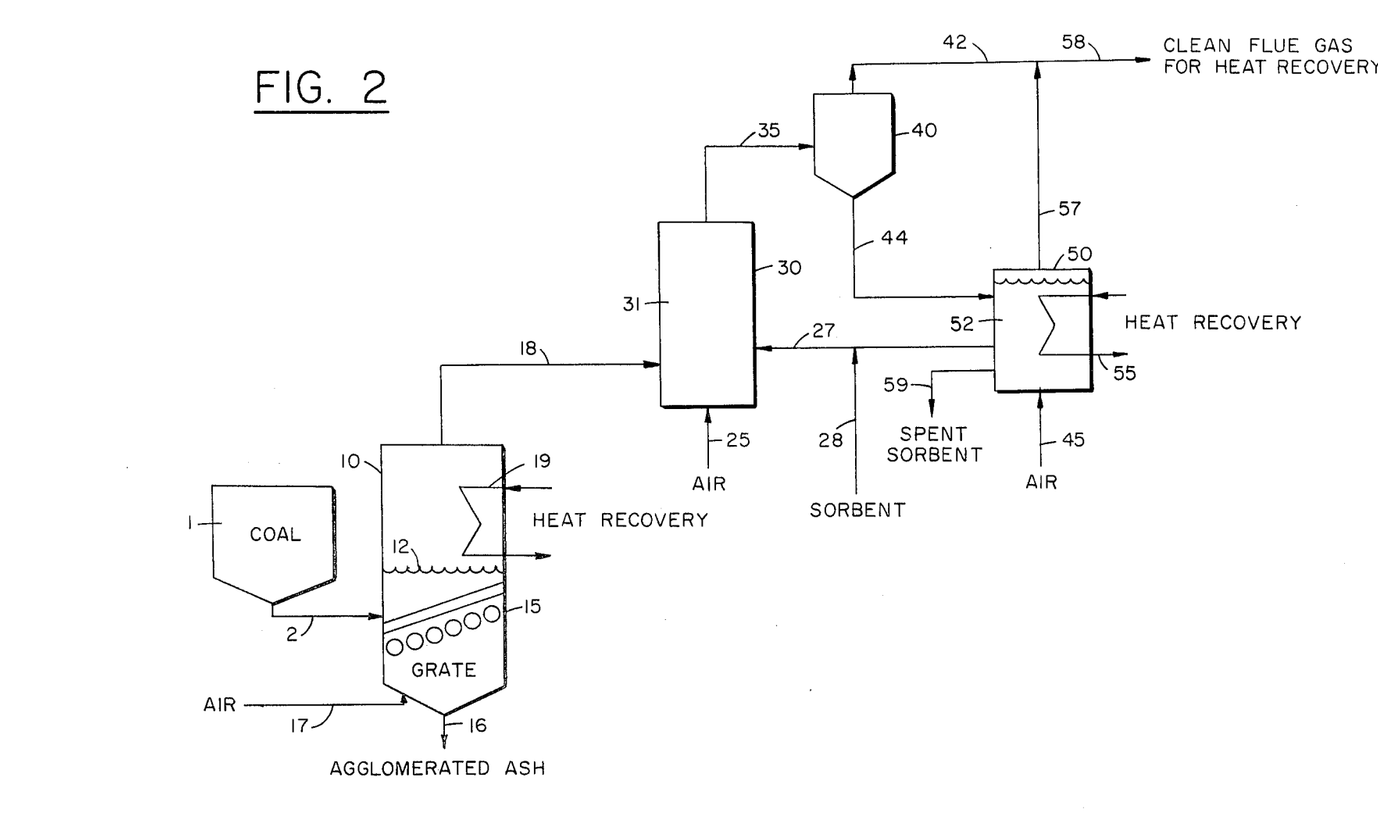
FIG. 2 is a simplified schematic of a three-stage fluidized bed embodiment of the carbonaceous solids combustion process of the present invention.

Referring now to FIG. 2, particulate coal 1 is supplied by line 2 to first stage combustion zone 10 containing a slow fluidized bed of solids 12 comprising coal particles and agglomerating ash particles. Agglomerates of ash form in bed 12 sink to moving inclined grate 15 which underlies the bed 12 and which carries the ash agglomerates to an ash pit via line 16. Air is admitted to combustion zone 10 via line 17 at a velocity of about 10 feet per second. The temperature in combustion zone 10 is maintained at a level of about 1300° C.

Combustion gases containing entrained finely-divided carbon are withdrawn from first stage combustion zone 10 via line 18. The temperature of the stream in line 18 is about 775° C. FIG. 2 includes a heat exchanger means 19 disposed in zone 10 above the upper level of the bed of solids 12.

The combustion gas effluent containing entrained finely-divided carbon via stream 18 is then contacted with air stream 25 and finely-divided refractory solids (line 27) in fast fluidized bed second stage combustion zone 30 containing a fast fluidized bed of solids 31. The refractory solids through line 27 are provided at a temperature within the range from about 600°–800° C. When the circulating finely-divided refractory solids contain noxious gas sorbents such as limestone or dolomite, fresh sorbent may be added to the system via line 28.

Flue gases containing finely-divided refractory solids are withdrawn from second stage combustion zone 30 via line 35 and passed to separation means 40, (e.g., a cyclone) wherein flue gases are separated and recovered through line 42.

Separated finely-divided refractory solids are withdrawn through line 44 and contacted with air stream via line 45, which also serves as a fluidizing medium in third stage combustion zone 50 containing a very slow fluidized bed 52 of the finely-divided refractory solids. The bed 52 has heat exchange means 55 (e.g., heat exchange tubes using water/steam as the heat exchange medium) disposed therein to maintain the temperature of the solids in the zone at a temperature of about 750° C. Refractory solids are withdrawn from combustion zone 50 via line 27.

Clean flue gases are withdrawn through line 57 from the top of combustion zone 50. When the circulating finely-divided refractory solids contain noxious gas sorbents, such as limestone or dolomite, it is desirable to bleed spent sorbent periodically from zone 50 via line 59.

Although not shown in FIG. 2, it is apparent that further heat recovery means (e.g., economizers, and the like) may be employed before the flue gases are discharged to the atmosphere via line 58.

Figure 3:
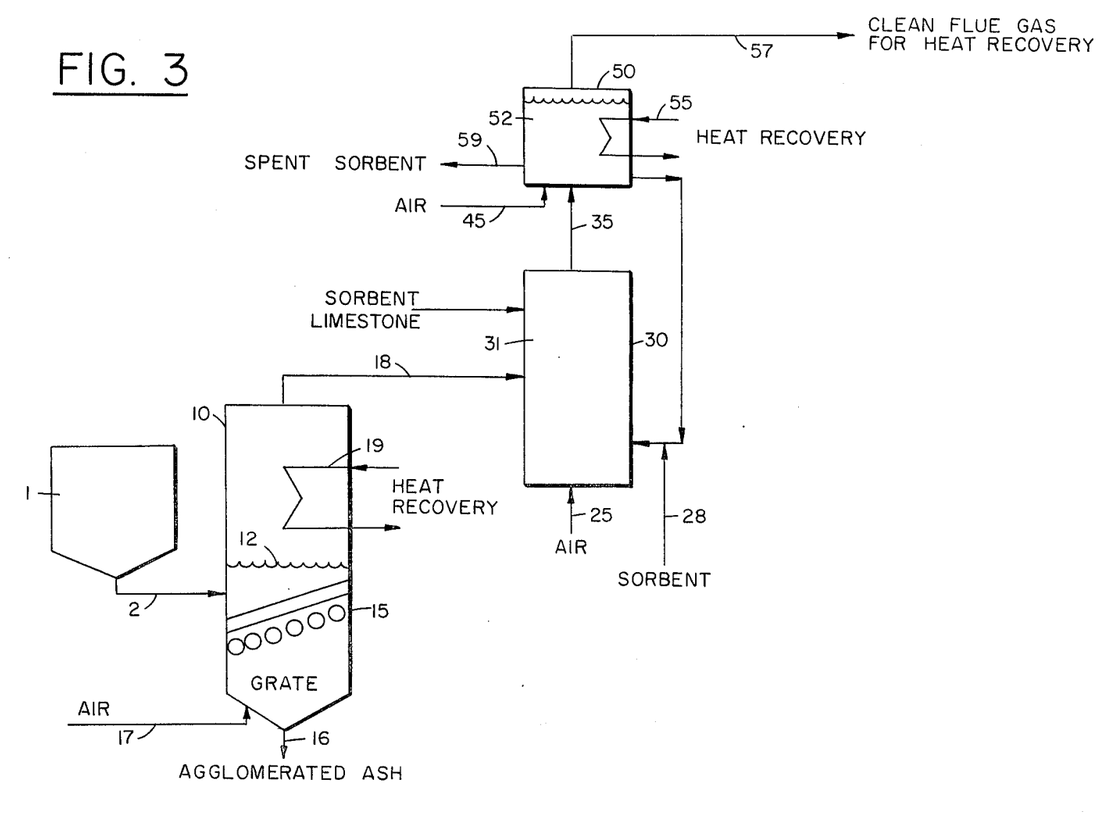
FIG. 3 is a simplified schematic of a preferred three-stage fluidized bed embodiment of the carbonaceous solids combustion process of the present invention.

FIG. 3 shows a further embodiment of the present invention process wherein the flue gases containing finely-divided refractory solids 35 are passed directly to zone 50 without first separating the solid and gas phases. Otherwise, the embodiment of FIG. 3 is as described in connection with FIG. 2.

The Invention Combustion Process As An Element In A Combined Cycle Power Plant There are substantial advantages in operating the present invention combustion process at elevated pressures. Availability of gases as effluents at high pressure is particularly advantageous for driving gas turbines, especially since the gaseous effluents require no further clean-up before used for such a purpose.

Pressures for stationary gas turbines are typically in the vicinity of 10 atmospheres. Gas-turbine inlet temperatures are variable but temperatures in excess of 1100° C. have been used. When the present invention combustion process is used to produce working fluid for a gas turbine, the embodiment shown in FIG. 3 is preferably employed and the working fluid comprises the flue gas stream 57. The temperature of this flue gas will be within the range between about 600°–800° C. The pressure will be dependent on the pressure of third stage combustion zone 50, which pressure is dependent on the pressure of second stage combustion zone 30, which is in turn dependent on the pressure of first stage combustion zone 10. In the embodiment of this invention wherein the combustion process is used as an element of a combined cycle power plant, the pressure of gas stream 57 (FIG. 3) will generally be within the range from about 1.0 to 30 atmospheres, and preferably from about 5 to 15 atmospheres.

Under this mode of operation, pressure in second stage combustion zone 30 will be slightly lower than in the first stage combustion zone. The pressure drop across second stage combustion zone 30 will vary in the range between about 0.1–5 psig.

Figure 4:
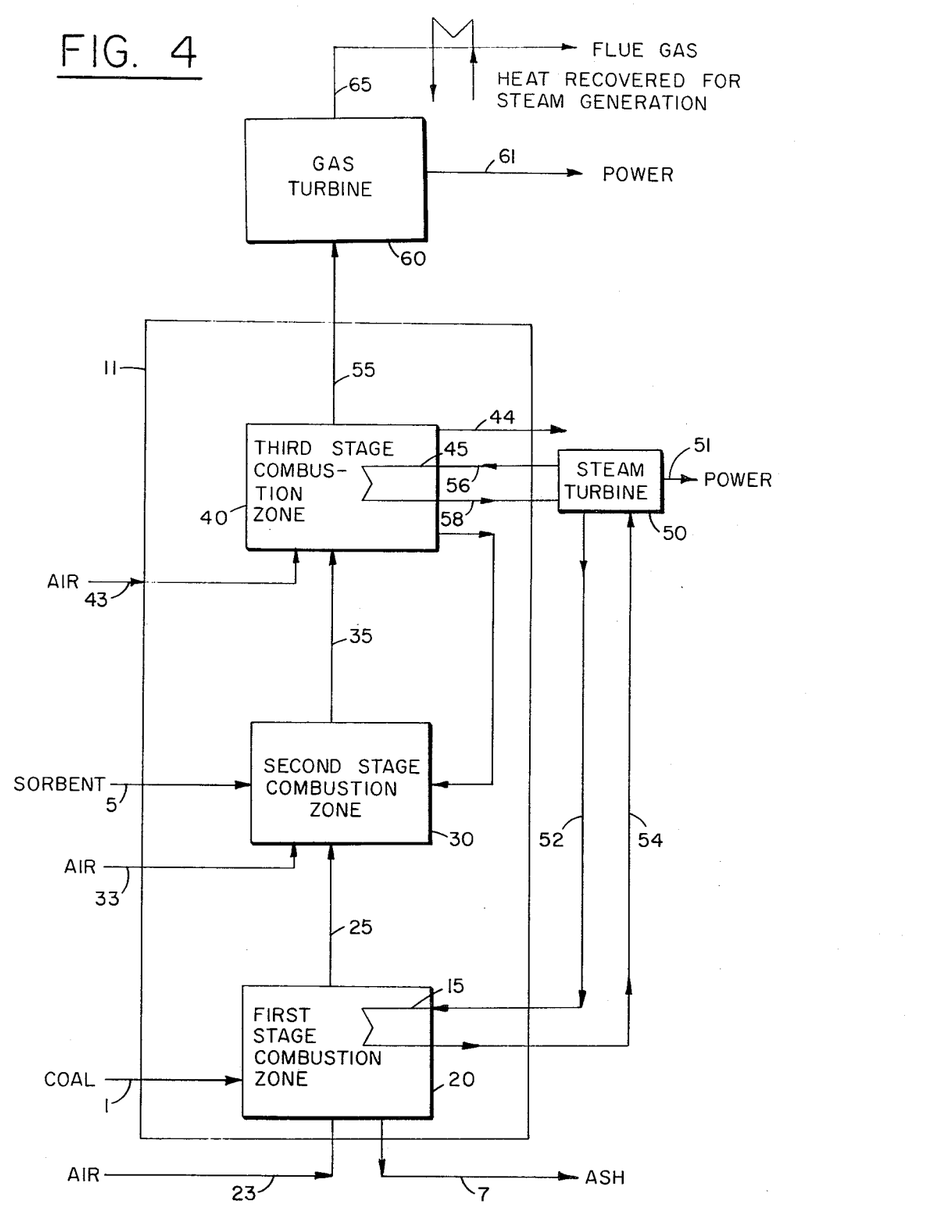
FIG. 4 is a block flow diagram simplified schematic of the combined cycle power plant of the present invention whih uses a combustion process as shown in FIG. 3.

Although the embodiment in FIG. 3 is illustrated when the invention process is used in a combined cycle power plant as shown in FIG. 4, it is apparent that a two-stage combustion process such as shown in FIG. 1 can also be employed, and can be operated with excellent economic advantage because of lower capital investment and operating costs.

Referring now to FIG. 4, a combined cycle power plant, which uses a combustion process such as that of FIG. 3, will be described. As shown in FIG. 4, gas turbine unit 60 is combined with steam turbine unit 50, with heat energy for driving both turbines provided by combustor 11, which combustor comprises slow fluidized bed first stage combustion zone 20, fast fluidized bed second stage combustion zone 30, and very slow fluidized bed third stage combustion zone 40. Gas turbine unit 60 and steam turbine unit 50 are connected in driving relationships to loads (not shown in FIG. 4) which may comprise electrical generators or compressors (e.g., air compressors). Examples of configurations that gas turbine unit 60 and steam turbine unit 50 can take will be described below with reference to FIGS. 5 and 6, respectively.

As shown in FIG. 4, coal 1 is introduced into the first combustion zone 20 of combustor 11 together with air (line 23) as oxidizing and fluidizing gas. Preferably, the method of ash withdrawal from combustion zone 20 is as described in U.S. Pat. No. 3,253,906, i.e., ash is withdrawn by a gravitating bed resting upon a slagging grate. The method of Godel, using a moving inclined grate discharging agglomerated ash into an ash pit, may also be employed with the provision of a sealed system so that the zone may operate under superatmospheric pressure conditions. Agglomerated ash material is withdrawn from combustion zone 20 via line 7.

First stage combustion zone 20 contains heat exchange means 15. This heat exchange means preferably comprises heat exchange tubes placed within the walls defining the space of combustion zone 20. The heat exchange surface may be above, or both above and below the upper surface of the slow fluidized bed of solids (not shown in FIG. 4) in that zone. As shown in FIG. 4, the heat exchange fluid employed in heat exchange means 15 is water/steam provided via line 52 and withdrawn therefrom via line 54.

Combustion gas effluent containing entrained finely-divided carbon are withdrawn from combustion zone 20 through line 25 and introduced to the fast fluidized bed second stage combustion zone 30 together with air (line 33) and recirculating finely-divided refractory solids provided through line 70. When the refractory solids comprise or contain noxious gas sorbents, fresh sorbent may be added through line 5. The temperature of fast fluidized bed second stage combustion zone 30 is controlled primarily by varying the temperature and recirculation rate of the finely divided refractory solids and by varying the superficial velocity of the fluidizing gas as described above.

A flue gas effluent containing entrained finely-divided solids in withdrawn from combustion zone 30 via line 35 to very slow fluidized bed third stage combustion zone 40 wherein the solids-containing flue gas 35 is contacted with air (line 43) as an oxidizing and fluidizing medium (which medium may alternatively comprise the flue gases in line 35 or may comprise such gases plus added air as previously described). The very slow fluidized bed of solids in combustion zone 40 contains heat exchange means 45 therein to maintain the solids in combustion zone 40 at a temperature within the range between about 600°–800° C. As shown in FIG. 4, the heat exchange fluid employed in heat exchange means 45 comprises water/steam provided via line 56 and withdrawn therefrom via line 58.

Finely-divided refractory solids from combustion zone 40 are recirculated via line 70 to combustion zone 30. When the refractory solids comprise or contain noxious gas sorbents, spent sorbent may be withdrawn at least periodically from zone 40 via line 44 to maintain sorbent activity.

Hot pressurized clean flue gases are withdrawn from combustor 11 from the top of third stage combustion zone 40 and passed via line 55 to gas turbine unit 60 for the production of power 61. Exhaust flue gases are discharged from the power plant via line 65.

Steam 58 produced in the heat exchange means 45 of combustion zone 40 and steam 54 produced in the heat exchange means 15 of combustion zone 20, are the motive fluids driving steam turbine unit 50 producing power 51.

Figure 5:
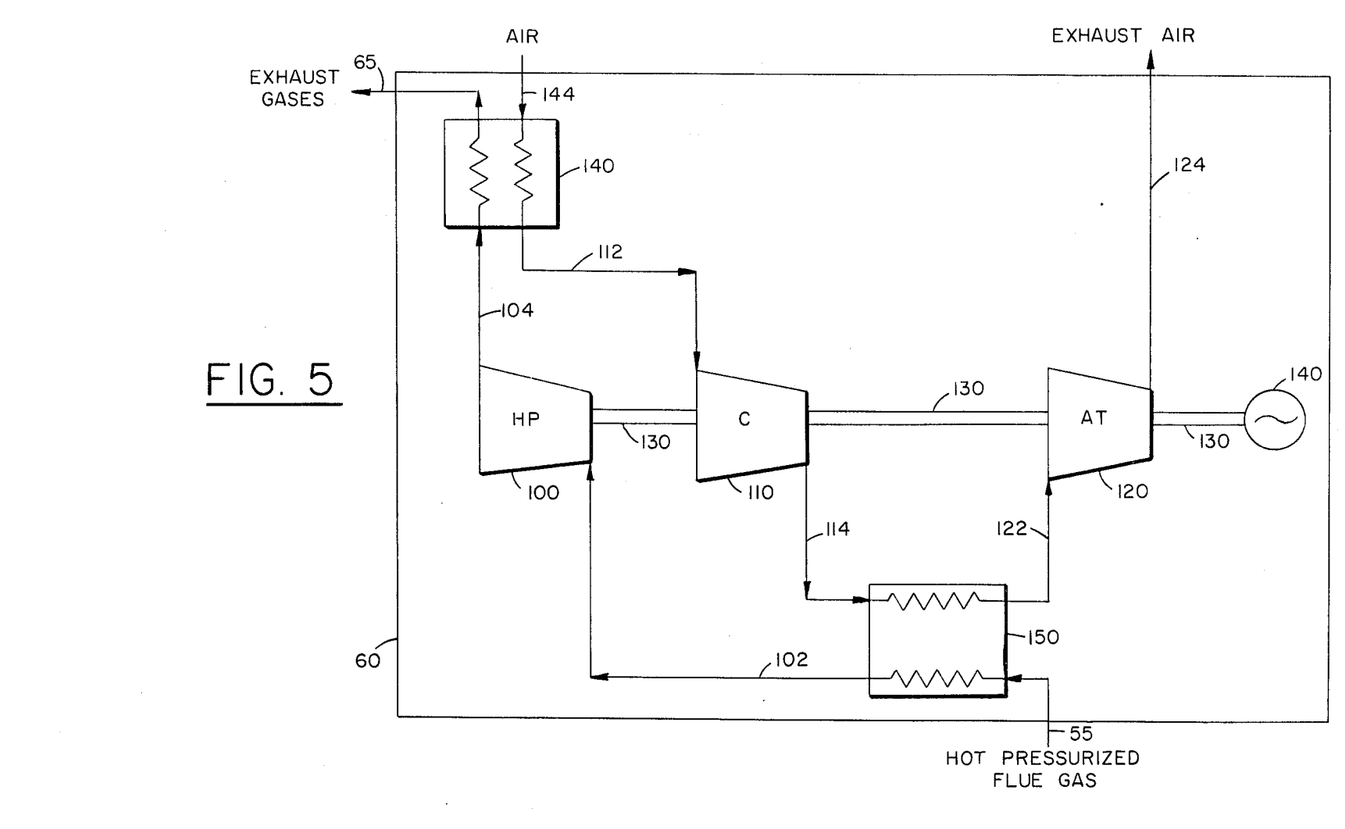
FIG. 5 is a simplified schematic of the gas turbine unit of FIG. 4.

FIG. 5 illustrates a specific embodiment of the gas turbine unit 60 of FIG. 4. Gas turbine unit 60 comprises a combustion gas turbine section 100, a compressor section 110, and an air turbine section 120 which are connected in driving relationship (indicated by shaft 130) to a load 140 which may be an electrical generator. Hot pressurized clean flue gas 55 (same reference number used in FIGS. 4 and 5) from combustor 11 (see FIG. 4) passes to heat exchanger 150 wherein heat energy is transferred from the flue gas 55 to a stream of pressurized air 114, which as heated pressurized air 122 is then expanded through air turbine 120, providing motive power thereto. The cooler pressurized flue gas 102 from exchanger 150 passes to combustion gas turbine 100, providing motive power thereto. Exhaust gases 104 from combustion gas turbine 100 pass to heat exchanger 140 wherein heat is transferred to air 144. Heated air 112 from exchanger 140 is pressurized in compressor 110 to provide the pressurized air which is further heated in exchanger 150, providing the motive fluid for air turbine 120. Clean exhaust gases 65 from exchanger 140 are discharged from the gas turbine unit 60.

Figure 6:
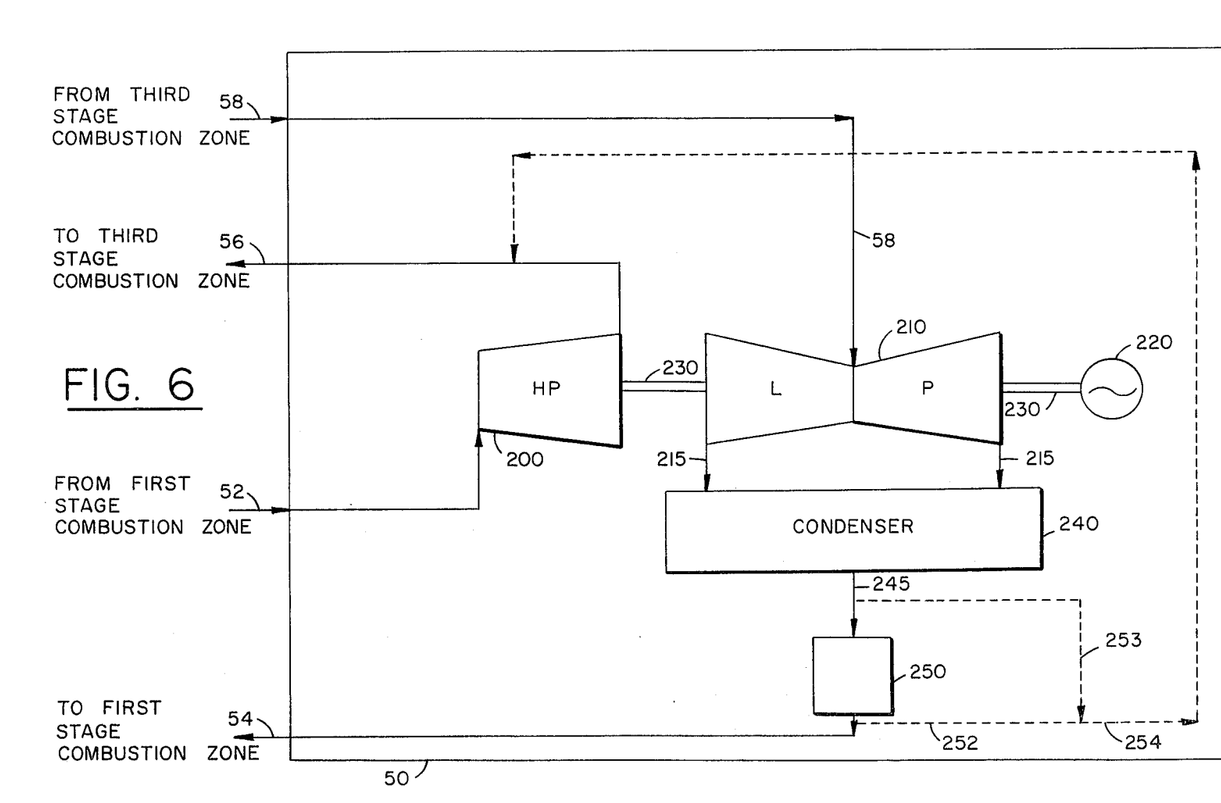
FIG. 6 is a simplified schematic of the steam turbine unit of FIG. 4.

FIG. 6 details a specific embodiment of the steam turbine unit 50. The steam turbine 50, again shown in a form representing only one of several configurations which can be used, comprises high pressure section 200 and low pressure section 210, connected in a driving relationship (indicated by shaft 230 in FIG. 6) to load 220 which may be an electrical generator. The steam cycle portion of the power plant will operate on essentially a closed cycle which will be described beginning with condensate in condenser 240.

Feedwater 245 from condenser 240 passes through feedwater heaters 250 (where it is heated by steam extracted at various pressure levels from steam turbine 50. Feedwater 245 may also be heated in various economizers in the system defined by FIGS. 3-6 as will be apparent to one skilled in the art. Heated feedwater 54 enters heat exchange means 15 of first stage combustion zone 20 (see FIG. 4) where steam 52 for the high pressure section 200 is generated. After expansion of high pressure steam 52 through high pressure section 200, expanded high pressure steam 56 is reheated in heat exchange means 45 of third stage combustion zone 40 (see FIG. 4) before expansion of reheated steam 58 through low pressure section 210, thus driving steam turbine 50 and associated load 220.

Steam as used in the foregoing description of FIG. 6 is not meant to be limiting, but only illustrative of the working fluids which may be employed in unit 50.

It will be noted that FIG. 6 also shows a line 253 whereby feedwater 245, and line 252 whereby heated feedwater 54, may be combined via line 254 with expanded high pressure steam 56 from high pressure section 200 and "reheated" in heat exchange means 45 of the auxiliary fluidized bed combustion zone 40 (see FIG. 4). This alternative flow scheme is to enable flexibility of heat recovery from the various combustion zones of combustor 11 as shown in FIG. 4.

Referring to FIG. 4, it will be seen that the invention combustion process when used in a combined cycle power plant is a clean, compact, highly efficient, and yet flexible, method for producing power from carbonaceous fuels such as coal. By control of the operating conditions of the combustor 11 as described in the foregoing discussion, more or less power may be produced in the gas turbine unit 60 or steam turbine unit 50.

Among other advantages, this flexibility enables the gas turbine section 60 to be operated so as to produce the oxidizing media of combustor 11 without loss of operating efficiencies and while maintaining low pollutant levels in the flue gas in line 65. In this latter connection, it is noted that operation of combustor 11 (especially combustion zones 30 and 40) under elevated pressure enhances sorption of noxious gases, further minimizing the noxious gas content of the flue gas in line 65.

Also noteworthy is the fact that the efficient ash-agglomerating phase in combustion zone 20, in combination with post-combustion in zones 30 and 40, produces an exceptionally solids-free motive fluid 55 for gas turbine unit 60. Further protection of the combustion gas turbine section 100 of FIG. 5 is provided by incorporating an air turbine section 120 in unit 60.

Other advantages of the combined cycle power plant will be apparent to those skilled in the art.

What is claimed is:

1. A two-stage fluidized bed process for burning carbonaceous solids which comprises (1) supplying particulate carbonaceous fuel and a molecular oxygen-containing gas stream as fluidizing medium to a primary combustion zone containing a slow fluidized bed of solids comprising carbonaceous particles and agglomerating ash particles, said primary combustion zone containing heat exchange means and being maintained at a temperature in the range between about 1200°–1400° C. sufficient to promote ash agglomeration but insufficient to cause ash fusion, and the superficial velocity of said fluidizing medium in the range between about 0.2–4 feet per second being sufficient to allow roughly spherical ash agglomeration to grow independently of one another without massive agglomeration; (2) withdrawing agglomerated ash matter from the bottom of the primary combustion zone, which ash matter constitutes at least about 95 weight percent of the carbonaceous fuel ash content; (3) withdrawing combustion gases containing entrained finely-divided carbon and having a temperature greater than 700° C. from the top of the primary combustion zone, wherein the combustion gases contain between about 30–50 weight percent of the carbon content introduced as carbonaceous feed; (4) contacting the combustion gases containing entrained finely-divided carbon with a secondary molecular oxygen-containing gas stream and finely-divided refractory solids with a gas fluidizing velocity between about 0.5–5 feet per second to provide a slow fluidized bed in a secondary combustion zone, said combustion zone being situated in a separate reactor unit and containing heat exchange means and being maintained at a temperature in the range between about 600°–900° C.; (5) withdrawing flue gases containing entrained finely-divided refractory solids from the top of said slow fluidized bed secondary combustion zone; and (6) separating the flue gases from the entrained finely-divided refractory solids in a separation zone.

2. A process in accordance with claim 1 wherein the molecular oxygen-containing gas stream is air.

3. A process in accordance with claim 1 wherein the refractory solids component in the step (4) secondary combustion zone is sand.

4. A process in accordance with claim 1 wherein the refractory solids component in the step (4) secondary combustion zone comprises a sorbent capable of absorbing or neutralizing noxious gas constituents.

5. A process in accordance with claim 4 wherein with sorbent comprises limestone or dolomite.

6. A three-stage fluidized bed process for burning carbonaceous solids which comprises (1) supplying particulate carbonaceous fuel and a molecular oxygen-containing gas stream as fluidizing medium to a first stage combustion zone containing a slow fluidized bed of solids comprising carbonaceous particles and agglomerating ash particles, said primary combustion zone containing heat exchange means and being maintained at a temperature in the range between about 1200°–1400° C. sufficient to promote ash agglomeration but insufficient to cause ash fusion, and the superficial velocity of said fluidizing medium in the range between about 2–20 feet per second being sufficient to allow roughly spherical ash agglomerates to grow independently of one another without massive agglomeration; (2) withdrawing agglomerated ash matter from the bottom of the first stage combustion zone, which ash matter constitutes at least about 95 weight percent of the carbonaceous fuel ash content; (3) withdrawing combustion gases containing entrained finely-divided carbon and having a temperature greater than 700° C. from the top of the first stage combustion zone, wherein the combustion gases contain between about 30–50 weight percent of the carbon content introduced as carbonaceous feed; (4) contacting the said combustion gases containing entrained finely-divided carbon with a molecular oxygen-containing gas stream and finely-divided refractory solids with a gas fluidizing velocity between about 25–40 feet per second to provide a fast fluidized bed in a second stage combustion zone, said combustion zone being maintained at a temperature in the range between about 700°–1000° C; (5) withdrawing flue gases containing entrained finely-divided refractory solids from the top of said fast fluidized bed second stage combustion zone; (6) separating the said flue gases from the entrained finely-divided refractory solids in a separation zone; (7) contacting the finely-divided refractory solids recovered from the separation zone with a molecular oxygen-containing gas stream as fluidizing medium with a gas fluidizing velocity between about 0.5–10 feet per second in a third stage combustion zone providing a slow fluidized bed of the finely-divided refractory solids, said fluidized bed containing heat exchange means therein to maintain the temperature of the fluidized refractory solids in the third stage combustion zone at a temperature within the range between about 600°–800° C; (8) withdrawing and recovering clean flue gases from the top of said fluidized bed third stage combustion zone; and (9) withdrawing finely-divided refractory solids from the bottom of said fluidized bed third stage combustion zone, and recycling the said withdrawn refractory solids to the step (4) fast fluidized bed second stage combustion zone.

7. A process in accordance with claim 6 wherein the molecular oxygen-containing gas stream supplied to each of the three combustion zones is air.

8. A process in accordance with claim 6 wherein the step (5) effluent is passed directly to the third stage combustion zone in step (7).

9. A process in accordance with claim 6 wherein the refractory solids component in the second stage and third stage combustion zones comprises a sorbent capable of absorbing or neutralizing noxious gas constituents.

10. A process in accordance with claim 9 wherein the sorbent comprises limestone or dolomite.

* * * * *